United States Patent [19]

Le Marrec

[11] Patent Number: 5,469,667
[45] Date of Patent: Nov. 28, 1995

[54] SEALING PROFILE FOR DOORS OF MOTOR VEHICLES

[75] Inventor: Robert Le Marrec, Bezons, France

[73] Assignee: Establissements Mesnel, Nanterre, France

[21] Appl. No.: 250,819

[22] Filed: May 31, 1994

[30] Foreign Application Priority Data

Jun. 4, 1993 [FR] France ................... 93 06728

[51] Int. Cl.⁶ ..................................... E06B 7/16
[52] U.S. Cl. ................ 49/477.1; 49/490.1; 49/495.1; 49/498.1; 296/146.9
[58] Field of Search ............... 49/490.1, 498.1, 49/495.1, 477.1; 296/146.9

[56] References Cited

U.S. PATENT DOCUMENTS

| | | | |
|---|---|---|---|
| 3,110,065 | 11/1963 | Dennis | 49/477.1 |
| 3,690,037 | 9/1972 | Kempel | 49/498.1 X |
| 4,114,320 | 9/1978 | Pullan | 49/498.1 X |
| 5,117,587 | 6/1992 | Doan | 49/495.1 |

FOREIGN PATENT DOCUMENTS 2239282  6/1991  United Kingdom ............ 49/498.1

*Primary Examiner*—Philip C. Kannan
*Attorney, Agent, or Firm*—Cumpston & Shaw

[57] ABSTRACT

This door joint comprises a fixing element (1) covering a projecting part (2) of a door-frame (3) and two tubular elements (6 and 8) made of a material deformed in an elastic manner, whereby one tubular element (6) adjoins the other tubular element (8) and said fixing element (1), said tubular elements (6 and 8) are to be interposed between door-frame (3) and associated door (7) in its closed position in order to ensure the tightness of the assembly.

According to the invention, the two tubular elements (6 and 8) communicate through at least one orifice (9) or through a continuous passage, whereby the compression of one of the tubular elements (6) between the door and the door-frame results in the deformation of said latter element and in an inflation of the second tubular element (8) between said door and said door-frame.

3 Claims, 1 Drawing Sheet

SEALING PROFILE FOR DOORS OF MOTOR VEHICLES

BACKGROUND OF THE INVENTION

The subject matter of the present invention relates to a door joint for motor vehicles.

It has been known that such door joints usually have a fixing element that can be firmly attached to a projecting part of the door-frame and an adjoining tubular element or "draught-tube" which can be deformed in an elastic manner while compressed between the door-frame and the associated door. The fixing element usually has a U-shaped section and a wireframe coated with polyvinylchloride, for example. This element caps a projecting border of the body and, to avoid its accidental disengagement from its bearing (said projecting border), the inner sides of the U-shaped section usually comprising rubber lips are designed to keep this part of the door joint in place. The "draught-tube" is usually made of cellular rubber or similar material and ensures the tightness between the door-frame and the associated door when compressed.

However, it is often preferable to reinforce this tightness and, in order to do so, the use of two adjoining tubular elements simultaneously deformed when the door is closed has been suggested. This well-known system, however, exhibits the disadvantage of requiring a greater effort when closing the door.

The object of the present invention is the elimination of this disadvantage by the suggested door joint made of two tubular elements which are to be gripped between a door-frame and the associated door, offering only low resistance to the closing of the door.

The present invention also suggests a sealing joint of this type, thereby ensuring improved tightness compared with the two tubular element joints of the previous technique.

Considering this, the object of the invention is a door joint for automobile doors comprising a fixing element covering a projecting part of the door-frame and two tubular elements made of a material deformed in an elastic manner. One tubular element is adjoining the other tubular element and the fixing element. These tubular elements are to be interposed between the door-frame and the associated door in its closed position in order to ensure the tightness of the assembly. This door joint is characterized in that the two tubular elements communicate through at least one orifice or a continuous passage. The compression of one of the tubular elements between the door and the door-frame results then in its deformation and in an inflation of the second tubular element between said door and said door-frame.

Preferably, the tubular element to be deformed will be placed between the edge of the door and the associated part of the door-frame while the second tubular element—communicating with the first one through at least one orifice or a continuous slit—will be interposed between the inside surface of the door and the door-frame. The size of this said second element is such that its compression between the door and the door-frame will only occur when said element is expanded due to the pressure of the air forced out from the other tubular element.

In other words, when the first tubular element is compressed between the edge of the door and the associated part of the door-frame, it is deformed and part of the air within is forced out and transferred into the second tubular element through communication orifices or through the continuous passage formed between them, so that said second element may expand and press firmly against the door and the door-frame while ensuring further tightness at this point.

Only one of the two tubular elements will then be directly engaged in the closing of the door and the joint according to the invention will not offer a closing resistance greater than the one offered by the single "draught-tube" joints of the previous technique. On the other hand, because of the inflation of the second tubular element in closed position of the door, the joint according to the invention will ensure reinforced tightness appearing in each of the two tubular elements.

The result is a noticeable improvement of the insulation (soundproofing) of the vehicle due to the two barriers created to oppose the passage of noise, as well as improved water-tightness.

BRIEF DESCRIPTION OF THE DRAWINGS

One form of embodiment of the invention is illustrated by the drawings at the end of this document.

DETAILED DESCRIPTION OF THE INVENTION

Figure 1:
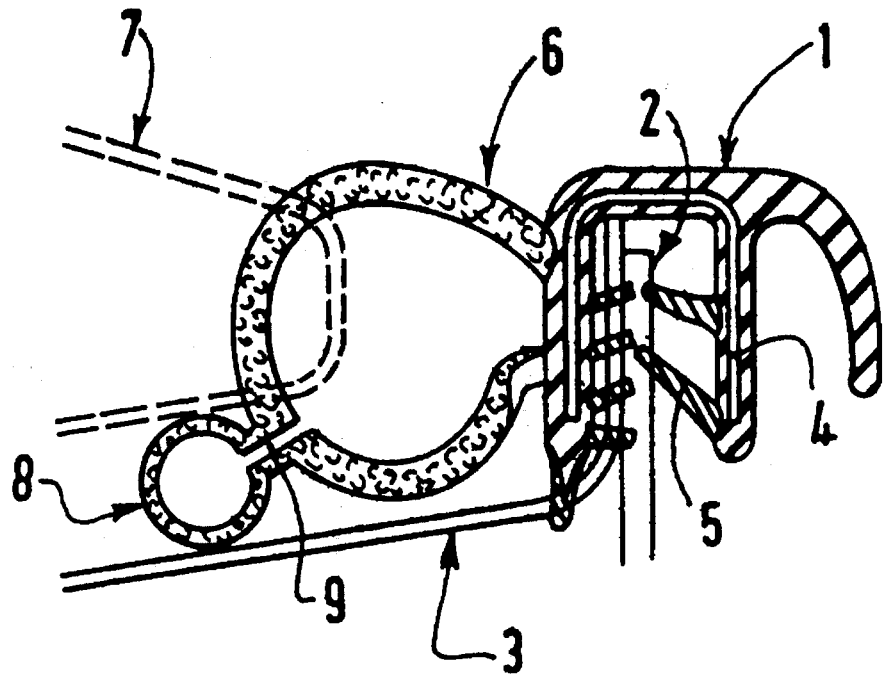
FIG. 1 is a cross-sectional-view indicating the shape and position of the door joint on the door-frame when the door is open.

FIG. 1 shows that the door joint according to the invention comprises a fixing element (1) having a U-shaped section coveting a projecting border (2) of the door-frame (3), the broken line indicating the door in closed position.

Said element (1) comprises a known wireframe (4) coated with polyvinylchloride, for example, and rubber lips (5) protruding towards the border (2) thereby ensuring that said element (1) is held against the frame.

A tubular element (6) adjoining the fixing element (1) is intended to be compressed between the door and the associated part of the door-frame when the door (7) is closed. A second, smaller, tubular element (8) is adjacent said element (6) and communicates with it through orifices (9). Said elements (6 and 8) are made of a material which can be deformed in an elastic manner, for example, cellular rubber.

Figure 2:
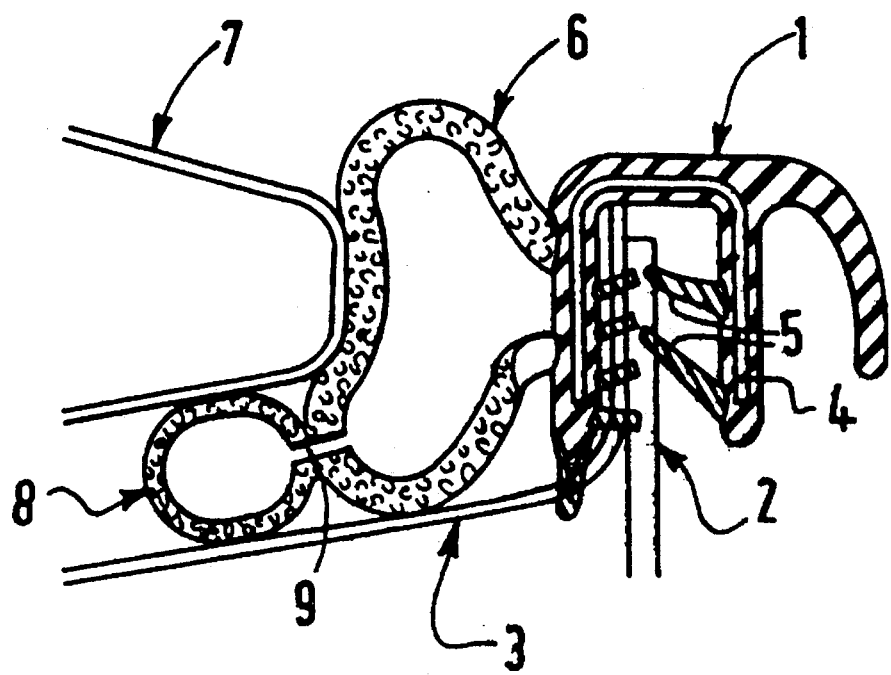
FIG. 2 is also a cross-sectional view of the door joint deformed by compression when the door is closed.

As shown in FIG. 1, the dimensions of element (8) are such that it is not directly compressed by said door (7) while the latter is closed so that no resistance is offered to closing. On the other hand, as shown in FIG. 2, said element (6) is strongly engaged by the edge of door (7) when said door is closed. Said element is then deformed by compression, and, due to the applied pressure, the air within passes through the orifices (9) into element (8). Said element (8) then expands and presses firmly against the inside surface of the door and the door-frame.

The tightness of the door joint is primarily ensured by tubular element (6), while element (8) considerably reinforces the water-tightness as well as the insulation (soundproofing) of the vehicle.

A continuous passage may be provided instead of orifices (9); this could be a slit provided in the section between tubular elements (6 and 8).

Elements (1, 6 and 8) of the door joint according to the invention could be made in one step by co-extrusion. It is also possible to manufacture elements (6 and 8) separately; element (6) would then have a pad to seal it against the U-shaped section of element (1).

The communication between tubular elements (6 and 8) may be accomplished by different means available to those skilled in the art. In a preferred form of embodiment, elements (6 and 8) produced by co-extrusion, are parted by a very thin common partition (at least 1 mm) that can be cut continuously following extrusion, or said elements (6 and 8) may be inflated in order to burst the thin partition.

Therefore, the present invention provides a very effective system for reinforcing the tightness of doors and the soundproofing of motor vehicles.

I claim:

1. A door joint for automobile doors comprising a fixing element covering a projecting part of a door-frame and first and second tubular elements made of an elastically deformable material the first tubular element adjoining the second tubular element and said fixing element, said tubular elements adapted to be interposed between said door frame and an associated door in its closed position in order to ensure the tightness of the assembly, said door joint further comprising a communicating section between said first and second tubular elements configured at least as one orifice or a continuous passage so that the compression of the first tubular element between the door and the door-frame results in said first tubular element's deformation and in an inflation of the second tubular element between said door and said door-frame.

2. A door joint for automobile doors comprising a fixing element covering a projecting part of a door-frame and first and second tubular elements made of an elastically deformable material, the first tubular element adjoining the second tubular element and said fixing element, said tubular elements adapted to be interposed between said door frame and an associated door in its closed position in order to ensure the tightness of the assembly, said door joint further comprising a communicating section between said first and second tubular elements configured at least as one orifice or a continuous passage so that the compression of the first tubular element between the door and the door-frame results in said first tubular element's deformation and in an inflation of the second tubular element between said door and said door-frame, the first tubular element arranged in such a manner that it may be deformed by the door and compressed by an edge of the door while the second tubular element is interposed between an inside surface of the door and the door-frame.

3. The door joint according to claim 2, in which the dimensions of the second tubular element are such that said second tubular element is not directly affected by the door while it is closed, said second tubular element contacting the door only when said second tubular element expands due to the pressure of the air forced out from the first tubular element when the first tubular element is compressed.

* * * * *